United States Patent
Yu (10) Patent No.: US 8,818,469 B2
(45) Date of Patent: Aug. 26, 2014

(54) SLIDE-TYPE PORTABLE ELECTRONIC DEVICE

(75) Inventor: Ching-Jeng Yu, New Taipei (TW)

(73) Assignee: Wistron Corporation, New Taipei (TW)

( * ) Notice: Subject to any disclaimer, the term of this patent is extended or adjusted under 35 U.S.C. 154(b) by 64 days.

(21) Appl. No.: 13/609,674

(22) Filed: Sep. 11, 2012

(65) Prior Publication Data
US 2013/0148276 A1 Jun. 13, 2013

(30) Foreign Application Priority Data
Dec. 7, 2011 (TW) .............................. 100145093 A (51) Int. Cl.
*H04M 1/00* (2006.01)
(52) U.S. Cl.
USPC .............. 455/575.4; 455/575.8; 379/433.12
(58) Field of Classification Search
CPC ............... H05K 5/00; H05K 7/16; G06F 1/16
USPC .......................... 455/575.1–575.9, 90.1–90.3; 379/433.12; 248/286.1
See application file for complete search history.

(56) References Cited

U.S. PATENT DOCUMENTS

| | | | |
|---|---|---|---|
| 5,548,478 A | 8/1996 | Kumar et al. | |
| 6,862,171 B1 * | 3/2005 | Maskatia et al. | 361/679.06 |
| 7,611,113 B2 * | 11/2009 | Lai | 248/286.1 |
| 8,024,019 B2 * | 9/2011 | Miyaoka | 455/575.4 |
| 8,108,016 B2 * | 1/2012 | Gaddy | 455/575.4 |
| 8,108,019 B2 * | 1/2012 | Lin | 455/575.4 |
| 8,244,322 B2 * | 8/2012 | Li et al. | 455/575.8 |
| 8,248,772 B2 * | 8/2012 | Dai et al. | 361/679.02 |
| 8,559,623 B2 * | 10/2013 | Chen et al. | 379/433.12 |
| 8,713,758 B2 * | 5/2014 | Mitsui et al. | 16/357 |
| 2009/0296329 A1 | 12/2009 | Tsai et al. | |
| 2012/0175478 A1 * | 7/2012 | Chen et al. | 248/286.1 |

* cited by examiner

*Primary Examiner* — Sharad Rampuria
(74) *Attorney, Agent, or Firm* — The Mueller Law Office, P.C.

(57) ABSTRACT

A portable electronic device includes superposed base and sliding housings, a pair of guide units and a pair of slide rails that cooperate with each other to permit sliding movement of the sliding housing relative to the base housing along a sliding direction between closed and open positions, and a pair of correction mechanisms respectively adjacent to the slide rails and each including at least two push-back members. When the slide rails deviate from the sliding direction, the push-back members can push back the slide rails to a position parallel to the sliding direction so that the slide rails can slide smoothly relative to the guide units.

16 Claims, 10 Drawing Sheets

SLIDE-TYPE PORTABLE ELECTRONIC DEVICE

CROSS-REFERENCE TO RELATED APPLICATION

This application claims priority of Taiwanese Patent Application No. 100145093, filed on Dec. 7, 2011, the disclosure of which is incorporated herein by reference.

BACKGROUND OF THE INVENTION

1. Field of the Invention

The invention relates to a portable electronic device, and more particularly to a slide-type portable electronic device.

2. Description of the Related Art

A conventional mobile phone with a slide-type design usually has a display and a keyboard respectively disposed on two housings that can be superimposed one on top of the other. The two housings are connected to each other through a pair of parallel slide rail units, so that the housing with the display can slide relative to the housing with the keyboard. When the keyboard is not being used, the two housings are overlapped to reduce the size of the conventional mobile phone. If use of the keyboard is desired, the housing with the display is slid along the slide rails to expose the keyboard. Since the size of the mobile phone is small, it usually does not have non-smooth sliding problem.

Figure 1:
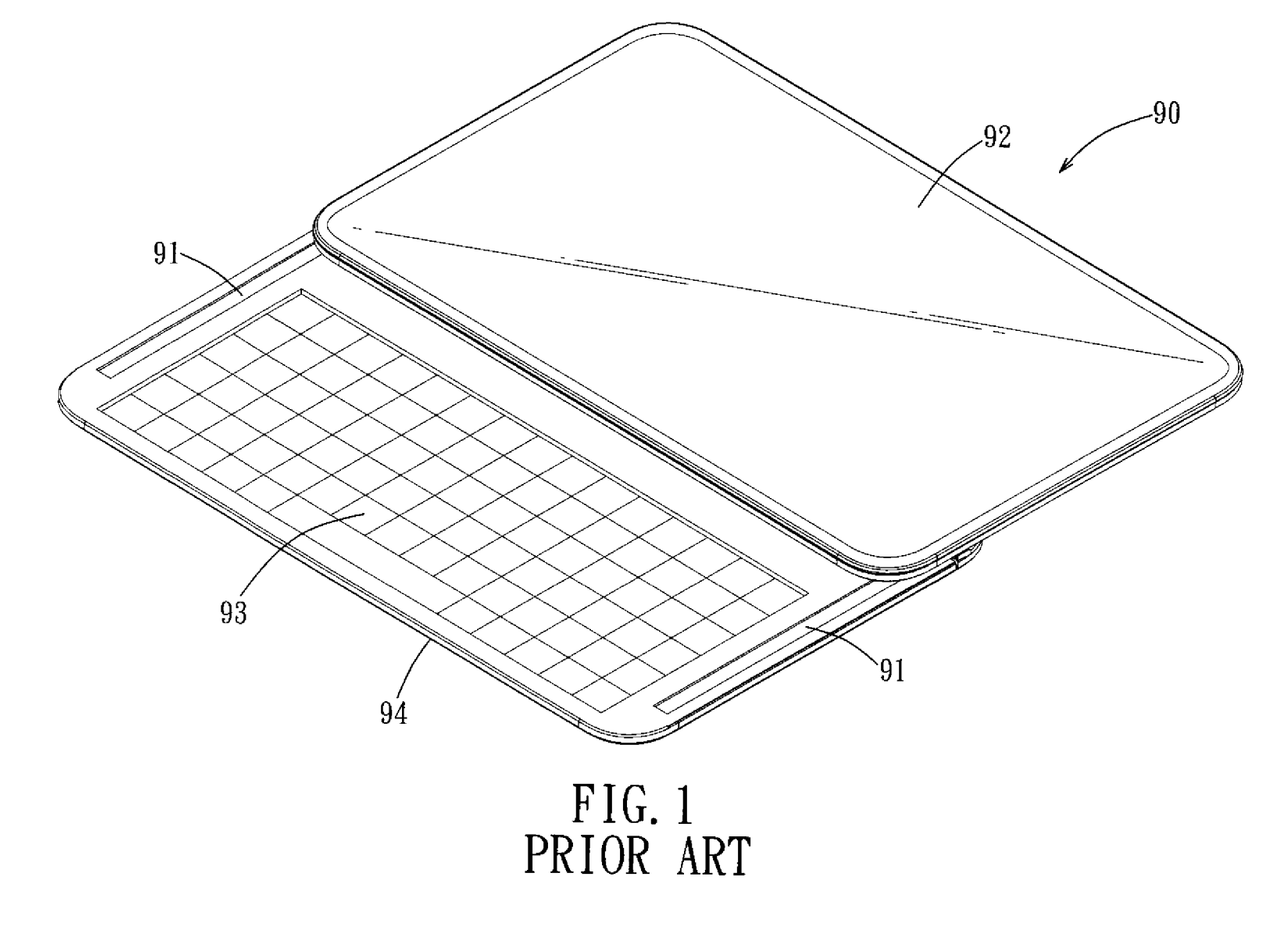
FIG. 1 is a perspective view of a conventional slide-type portable computer.

Referring to FIG. 1, currently, a portable computer 90 that is larger than a mobile phone also adopts the slide-type design, and includes a sliding housing 92, a base housing 94 disposed below the sliding housing 92 and having a keyboard 93, and a pair of slide rail units to connect the sliding housing 92 and the base housing 94. Because the size of the portable computer 90 is larger than that of the mobile phone, parallel slide rails 91 of the slide rail units used by the portable computer 90 as compared with that of the mobile phone are longer and are farther from each other. Thus, when a force applied to the sliding housing 92 to open or close the same is not uniform, uneven and non-smooth sliding movement of the sliding housing 92 will occur. For example, when a user pushes the sliding housing 92 from a bottom right corner thereof with one hand to expose the keyboard 93, the right side of the sliding housing 92 moves rearward firstly, and the left side thereof moves later in response to the movement of the right side. This results in the sliding housing 92 slightly moving to the left and deviating from the slide rails 91. Thus, the sliding housing 92 may be stuck and cannot slide smoothly in the rearward direction. A force must be applied to the left side of the sliding housing 92 to move the sliding housing 92 in place. Therefore, the user usually uses both hands to push the sliding housing 92 to move the same smoothly along the slide rails 91. Operation of the aforesaid portable computer is thus very inconvenient.

SUMMARY OF THE INVENTION

Therefore, an object of the present invention is to provide a slide-type portable electronic device that is capable of overcoming the aforementioned drawback of the prior art.

According to the present invention, a portable electronic device comprises a base housing, a sliding housing, a slide mechanism and a pair of correction mechanisms. The sliding housing is superposed on the base housing. The slide mechanism includes a pair of guide units disposed on the base housing, and a pair of slide rails disposed on the sliding housing. The pair of the guide units and the pair of the slide rails cooperate with each other to permit sliding movement of the sliding housing relative to the base housing along a sliding direction between a closed position and an open position. The pair of the correction mechanisms are disposed on the base housing and are respectively adjacent to the slide rails. Each of the correction mechanisms includes at least two spaced-apart push-back members arranged along the sliding direction. When the slide rails deviate from the sliding direction, the push-back members can push back the slide rails to a position parallel to the sliding direction so that the slide rails can slide smoothly relative to the guide units.

The efficiency of the present invention resides in the use of the correction mechanisms which enable the sliding housing to move smoothly between the open position and the closed position and vice versa to thereby facilitate one-hand operation thereof and which have buffering and shock-absorbing functions. Further, because the buffer mechanism ensures that the speed of the sliding housing when reaching the closed position is not too fast, a large impact among the positioning components can be prevented. In addition, the buffer mechanism can produce a resilient force the moment the sliding housing is opened to assist in pushing the sliding housing to slide toward the open position, so that the user exerts a minimum effort.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE PREFERRED EMBODIMENT

The above-mentioned and other technical contents, features, and effects of this invention will be clearly presented from the following detailed description of one embodiment in coordination with the reference drawings.

Figure 2:
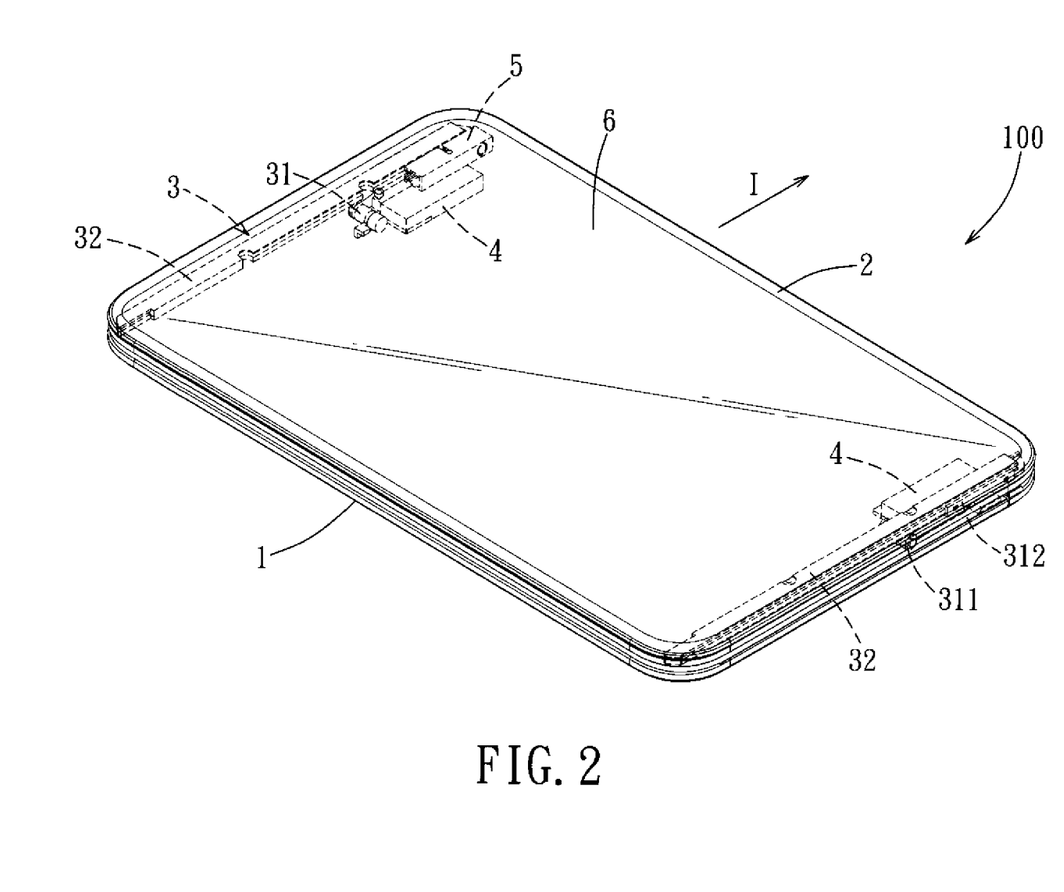
FIG. 2 is a perspective view of a slide-type portable electronic device according to the embodiment of the present invention, illustrating a sliding housing in a closed position.
Figure 3:
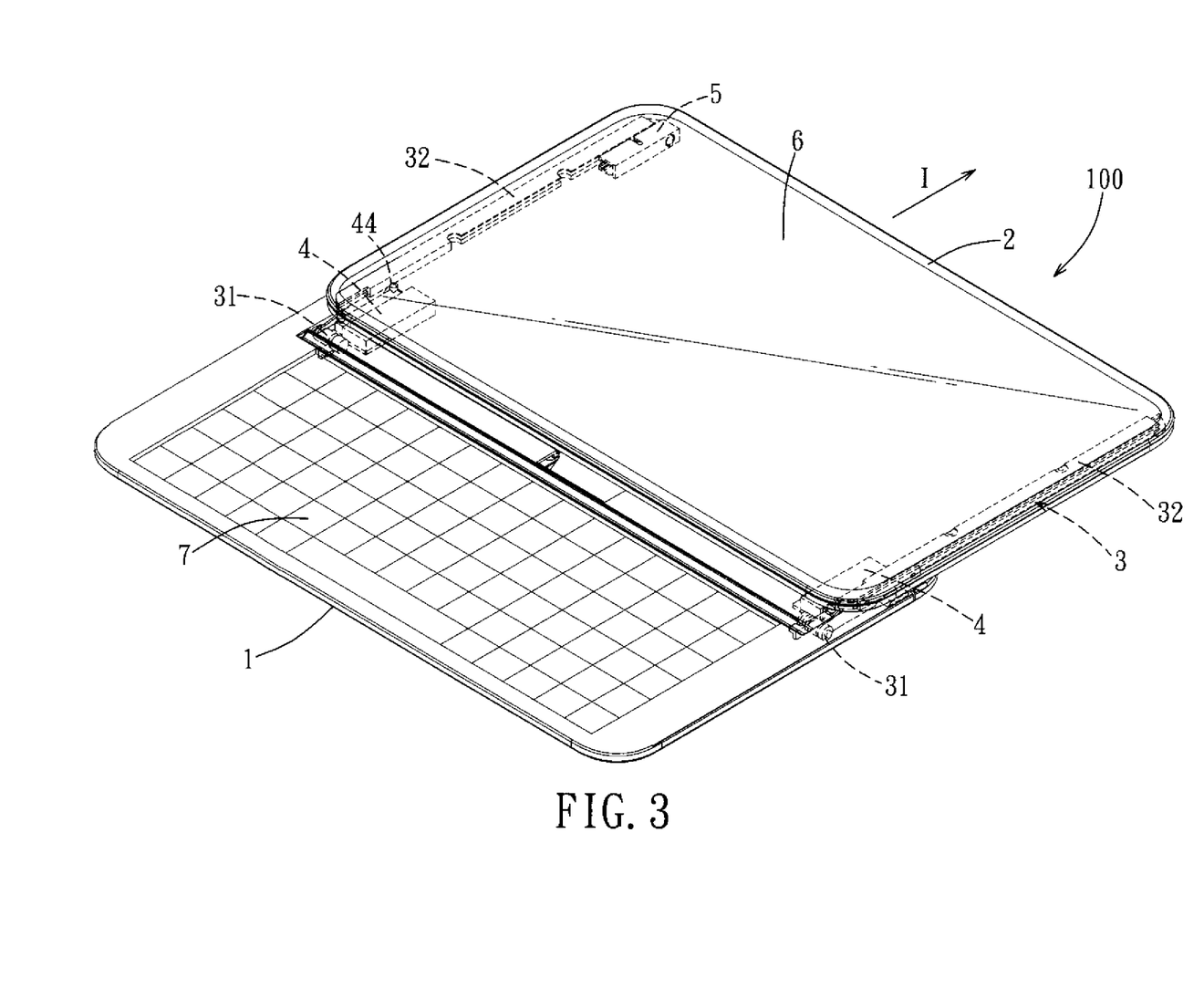
FIG. 3 is a perspective view of the embodiment, illustrating the sliding housing in an open position.
Figure 4:
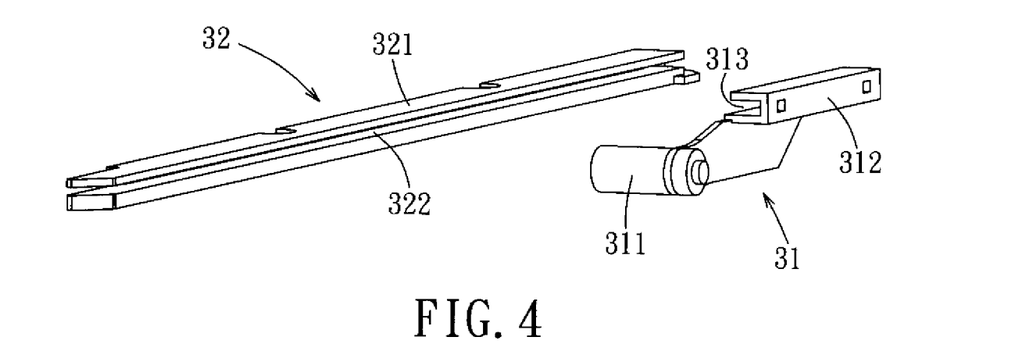
FIG. 4 is an enlarged exploded perspective view of a slide mechanism of the embodiment.
Figure 5:
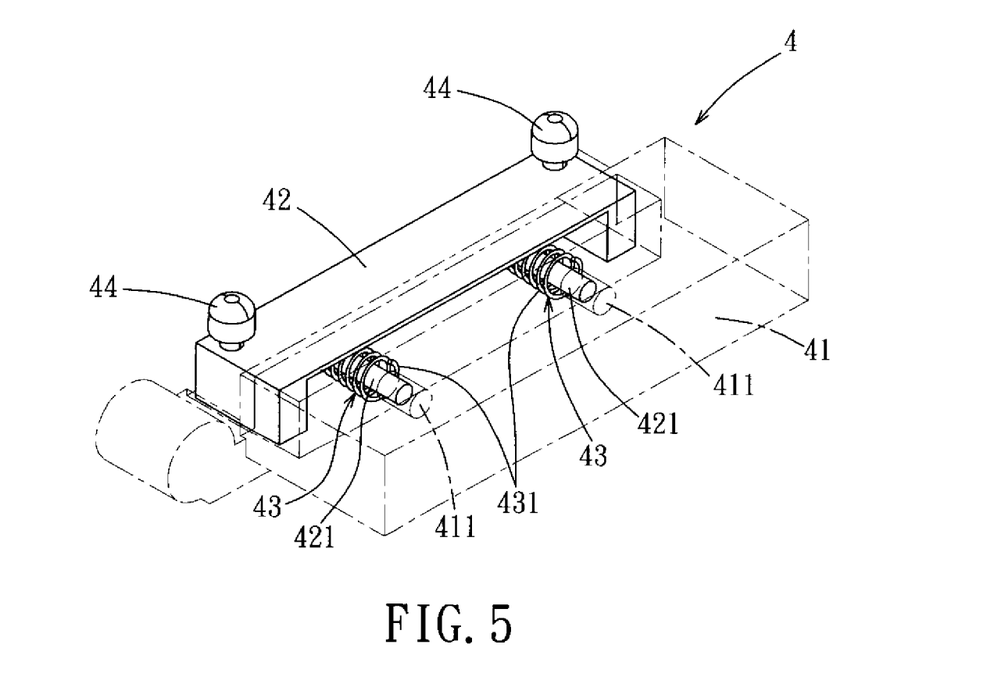
FIG. 5 is an enlarged perspective view of a correction mechanism of the embodiment.

Referring to FIGS. 2, 3 and 4, a slide-type portable electronic device 100 according to the embodiment of the present invention comprises a base housing 1, a sliding housing 2 superposed on the base housing 1, a slide mechanism 3, a pair of correction mechanisms 4, and a buffer mechanism 5. In this embodiment, the sliding housing 2 includes a display 6, and the base housing 1 includes a keyboard 7.

Figure 16:
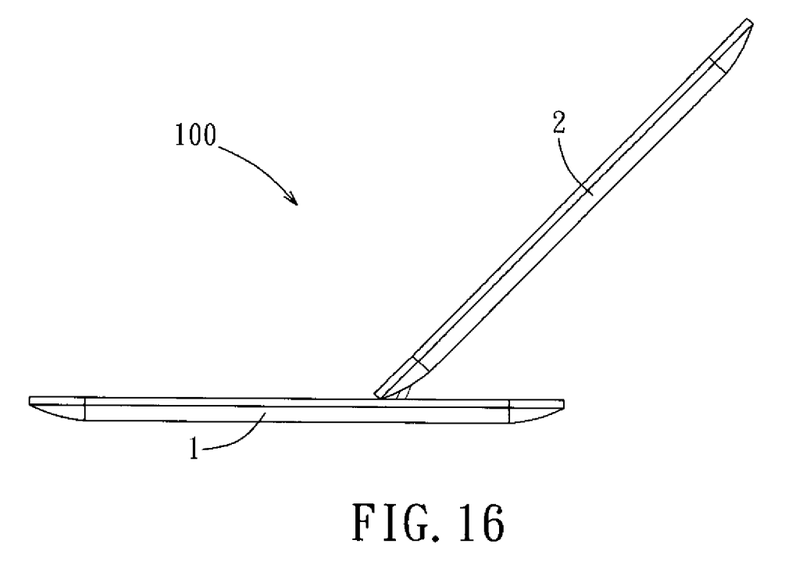
FIG. 16 is a schematic side view of the embodiment, illustrating the sliding housing in an inclined state.

The slide mechanism 3 includes a pair of guide units 31 disposed on the base housing 1, and a pair of slide rails 32 disposed on the sliding housing 2. The pair of the guide units 31 and the pair of the slide rails 32 cooperate with each other to permit sliding movement of the sliding housing 2 relative to the base housing 1 along a front-rear sliding direction (I) between a closed position (see FIG. 2) and an open position (see FIG. 3). The guide units 31 are disposed respectively on left and right sides of the base housing 1 in proximity to a rear end thereof. That is, when the sliding housing 2 is in the open position, the guide units 31 are respectively located on two opposite sides of an overlapping area of the base housing 1 and the sliding housing 2. Each of the guide units 31 has a fixed portion 311 fixed to the base housing 1, and a guide portion 312, in the form of a guide rail, connected pivotally to the fixed portion 311 and defining a slide groove 313. The slide rails 32 are respectively disposed on two opposite sides of the sliding housing 2, and are parallel to each other along the sliding direction (I). Each of the slide rails 32 has a U-shaped rail body 321 defining a slide groove 322. The slide grooves 313 and 322 are opened in a direction opposite to each other (see FIG. 6). The guide portion or guide rail 312 of each guide unit 31 extends partially into the slide groove 322 in the respective slide rail 32, and the rail body 321 of each slide rail 32 extends partially into the slide groove 313 in the respective guide unit 31. Each slide rail 32 is engaged slidably to the guide rail 312 of the respective guide unit 31 along the sliding direction (I). Further, when the sliding housing 2 is in the open position, because the guide rail 312 of each guide unit 31 is pivotable relative to the fixed portion 311 thereof, the sliding housing 2 can be pivoted relative to the base housing 1 to an inclined position, as shown in FIG. 16. Hence, viewing of the display 6 can be facilitated.

Referring to FIGS. 2, 3, 5 and 6, the correction mechanisms 4 are disposed on the base housing 1 and are adjacent to the respective slide rails 32. Each of the correction mechanisms 4 and each of the guide units 31 are respectively located on two opposite sides of each slide rail 32. That is, each slide rail 32 is located between each guide unit 31 and the respective correction mechanism 4, each guide unit 31 is located at the opened side of the slide groove 322 in the respective slide rail 32, and each correction mechanism 4 is located at a side opposite to the opened side of the slide groove 322. Each correction mechanism 4 includes a fixed seat 41 fixed to the base housing 1, a movable seat 42 connected to the fixed seat 41 and movable relative to the same in a direction perpendicular to the sliding direction (I), a resilient unit 43 disposed between the movable seat 42 and the fixed seat 41, and two spaced-apart push-back members 44 disposed on the movable seat 42 and arranged along the sliding direction (I). In this embodiment, the fixed seat 41 includes two spaced-apart receiving slots 411, and the movable seat 42 includes two support rods 421 extending respectively and slidably in the receiving slots 411. The resilient unit 43 includes two coil springs 431 respectively sleeved on the support rods 421 and disposed between and abutting against the fixed seat 41 and the movable seat 42. The coil springs 431 are compressed when the movable seat 42 moves toward the fixed seat 41 so as to store a restoring force to restore the movable seat 42 to its original position. A buffer space is provided in the fixed seat 41 for resilient displacement of the movable seat 42. Each of the push-back members 44 is configured as a roller for reduction of a frictional force. Because the push-back members 44 are disposed on the movable seat 42, they can move along with the movable seat 42 toward the fixed seat 41 and restore to their original positions through the biasing action of the coil springs 431 exerted on the movable seat 42.

Figure 6:
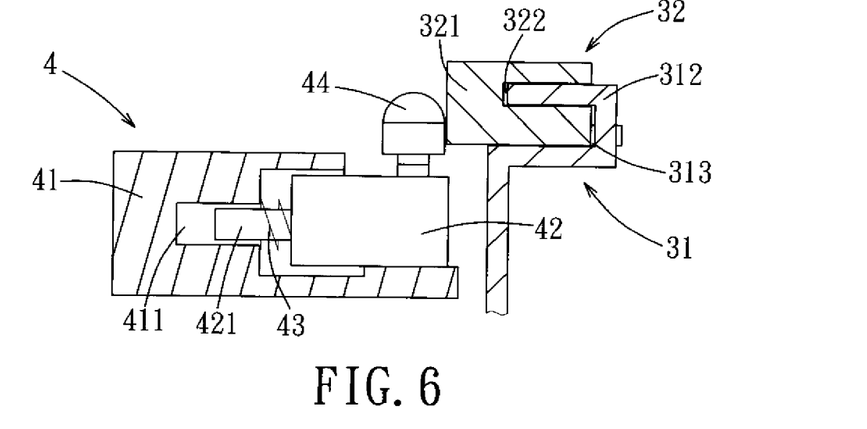
FIG. 6 is an enlarged sectional side view of the embodiment, illustrating a relationship between the correction mechanism and a slide rail of the slide mechanism.
Figure 7:
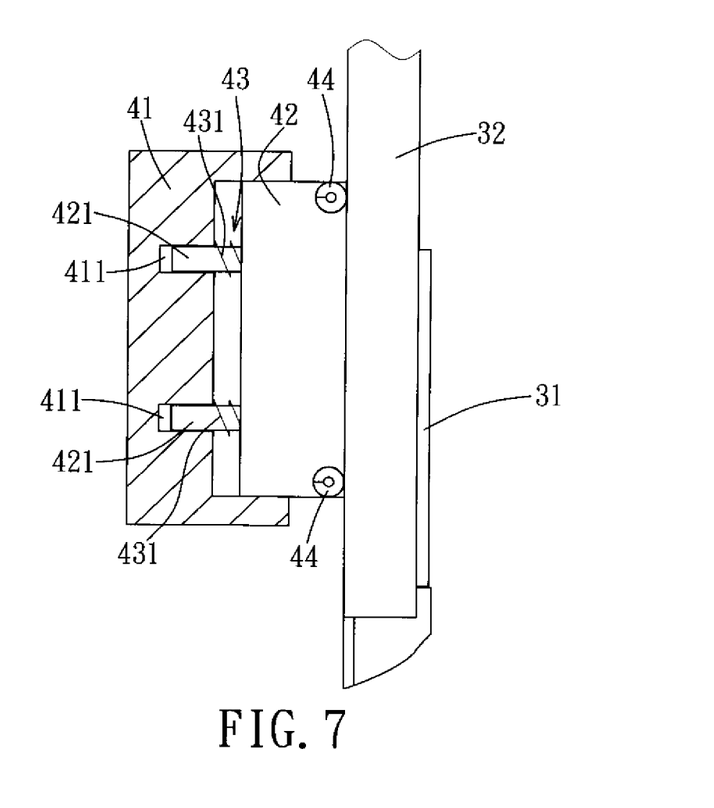
FIG. 7 is an enlarged partly sectional top view of the embodiment, illustrating the relationship between the correction mechanism and the slide rail of the slide mechanism.

Referring to FIGS. 6 and 7, because the two push-back members 44 of each correction mechanism 4 are arranged along the sliding direction (I) and are adjacent to the corresponding slide rail 32, when a force applied to slide the sliding housing 2 from the closed position (see FIG. 2) to the open position (see FIG. 3) and vice versa is not uniform, each slide rail 32 will deviate from the sliding direction (I) and collide against the two push-back members 44. The push-back members 44, in turn, are pushed to move in the direction perpendicular to the sliding direction (I), and then restore to their original positions through the biasing action of the resilient unit 43. At the same time, through the restoring force of the resilient unit 43, the push-back members 44 can push the slide rail 32 back to a position that is parallel to the sliding direction (I). In addition, because the correction mechanisms 4 are disposed opposite to each other, the slide rails 32 that deviate leftward or rightward can be timely adjusted through the push-back members 44 of the correction mechanisms 4 that push the slide rails 32 back to the position that is parallel to the sliding direction (I). The slide groove 322 in each slide rail 32 can thus be maintained parallel to the slide groove 313 in the respective guide unit 31, thereby maintaining smooth sliding of the pair of the slide rails 32 relative to the pair of the guide units 31. Hence, operation of the portable electronic device 100 using one hand of the user can be facilitated. Moreover, the two push-back members 44 of each correction mechanism 4 are capable of moving resiliently along with the corresponding movable seat 42 when collided by the slide rail 32, so that they have buffering and shock-absorbing functions.

Referring to FIGS. 8 to 11, in combination with FIG. 3, the buffer mechanism 5 is disposed on the sliding housing 2 adjacent to one of the slide rails 32 and is proximate to a rear side of the sliding housing 2. The buffer mechanism 5 includes a hollow mounting seat 51, a slide member 52, a buffer unit 53, and a positioning element 54. The mounting seat 51 is fixed to the sliding housing 2. The slide member 52, the buffer unit 53 and the positioning element 54 are disposed inside the mounting seat 51. The mounting seat 51 includes a slide track 511. The slide member 52 has a main body portion 521, a stop portion 522 and a limiting portion 523. The main body portion 521 is elongated along the sliding direction (I), and is slidable in the slide track 511 of the mounting seat 51. The stop portion 522 extends transversely from one end of the main body portion 521 and protrudes outwardly from the mounting seat 51. The slide groove 322 in the slide rail 32 that is adjacent to the buffer mechanism 5 has one side opening from a front end to a rear end of the slide rail 32 for extension of the guide rail 312 of the respective guide unit 31 (see FIG. 4) into the slide rail 32, and another side opening partially from the front end of the slide rail 32 for extension of the stop portion 522 into the slide rail 32. Through this configuration, when the sliding housing 2 approaches or moves away from the closed position, the stop portion 522 can interact with the guide unit 31, which will be described in detail below. The limiting portion 523 of the slide member 52 is formed on the main body portion 521 opposite to the stop portion 522 in a left-right direction to engage with the positioning element 54. The engagement between the limiting portion 523 and the positioning element 54 will be further described in detail below.

Figure 9:
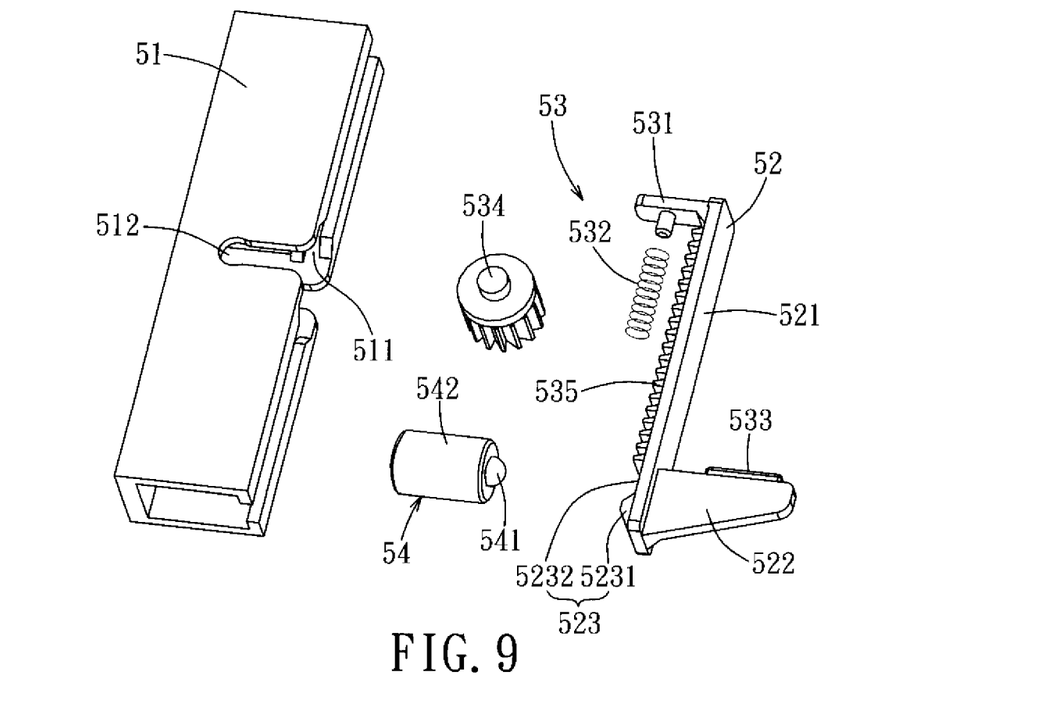
FIG. 9 is an enlarged exploded perspective view of the buffer mechanism of the embodiment.
Figure 10:
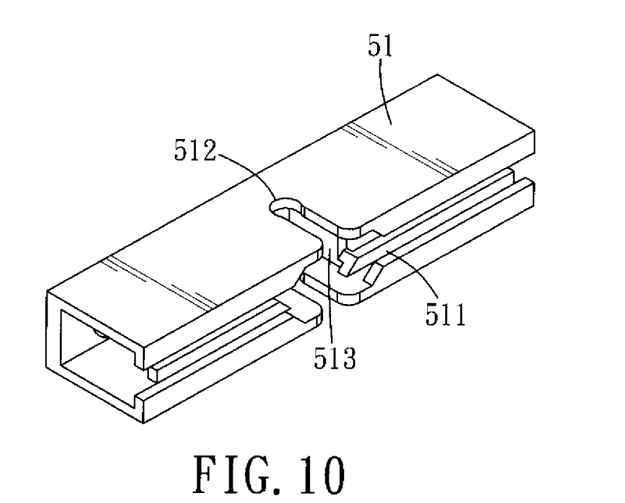
FIG. 10 is an enlarged perspective view of a mounting seat of the buffer mechanism.

The buffer unit 53 includes a pressed portion 531, a spring member 532, a cushion pad 533, a damping gear 534, and a rack gear 535. The pressed portion 531 is connected to the slide member 52, and extends transversely from the other end of the main body portion 521 into the mounting seat 51. The pressed portion 531 is disposed in the mounting seat 51 in proximity to one end thereof, and is spaced apart from the limiting portion 523 in the sliding direction (I). The mounting seat 51 further includes a retaining groove 512, and a spacer 513 adjacent to the retaining groove 512 and spaced apart from the pressed portion 531. The spring member 532 is connected between the pressed portion 531 and the spacer 513. The positioning element 54 is disposed in the mounting seat 51 opposite to the pressed portion 531. The damping gear 534 is received in the retaining groove 512, and is located between the spring member 532 and the positioning element 54. The rack gear 535 is formed integrally as one piece with the main body portion 521, meshes with the damping gear 534, and is located between the pressed portion 531 and the limiting portion 523. The limiting portion 523 includes a curved protrusion 5231 and a limiting groove 5232. The limiting groove 232 is located between the curved protrusion 5231 and the rack gear 535. In this embodiment, the positioning element 54 is a cylinder having a cylinder body 542, and a plunger 541 mounted movably in the cylinder body 542. The plunger 541 retracts into the cylinder body 542 when pressed by the curved protrusion 5231, and protrudes outwardly from the cylinder body 542 in the absence of an external force to extend into the limiting groove 5232. The cushion pad 533 is disposed on one side of the stop portion 522 that faces the guide unit 31 (see FIG. 4). In this embodiment, the cushion pad 533 is made of rubber.

Figure 8:
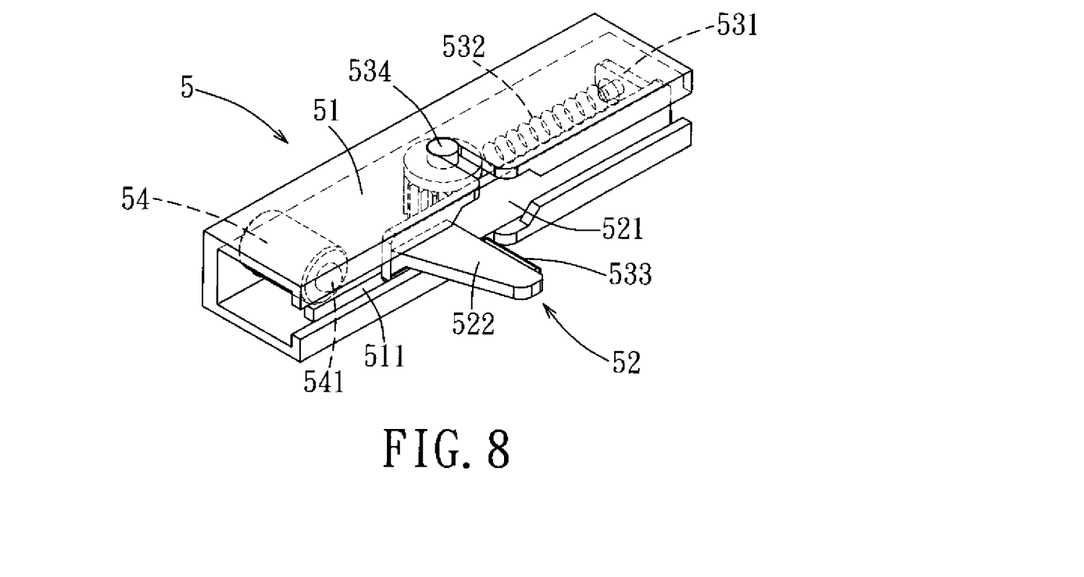
FIG. 8 is an enlarged perspective view of a buffer mechanism of the embodiment.
Figure 11:
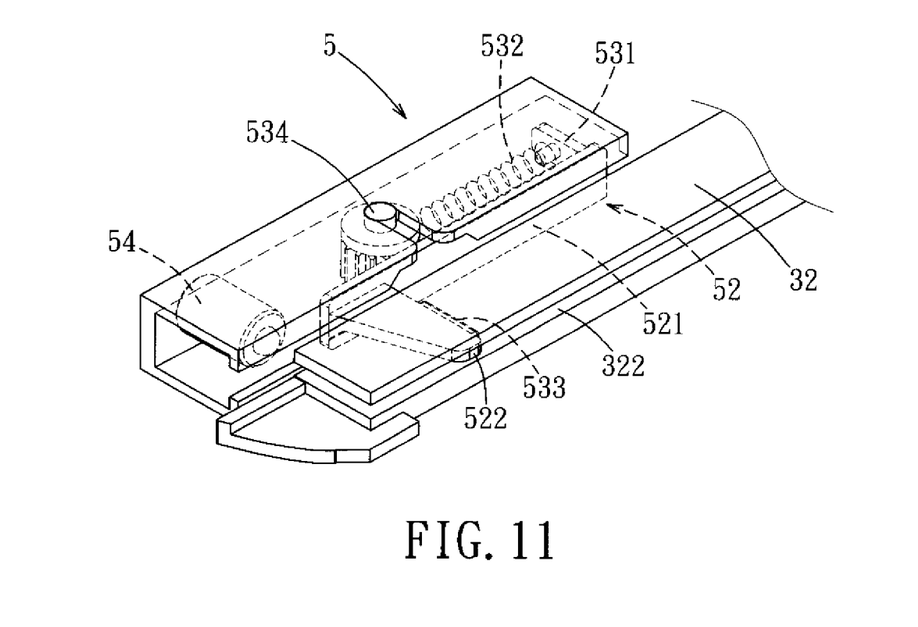
FIG. 11 is a fragmentary enlarged perspective view of the embodiment, illustrating a spring member of the buffer mechanism in a non-compressed state when the sliding housing is in the open position.
Figure 12:
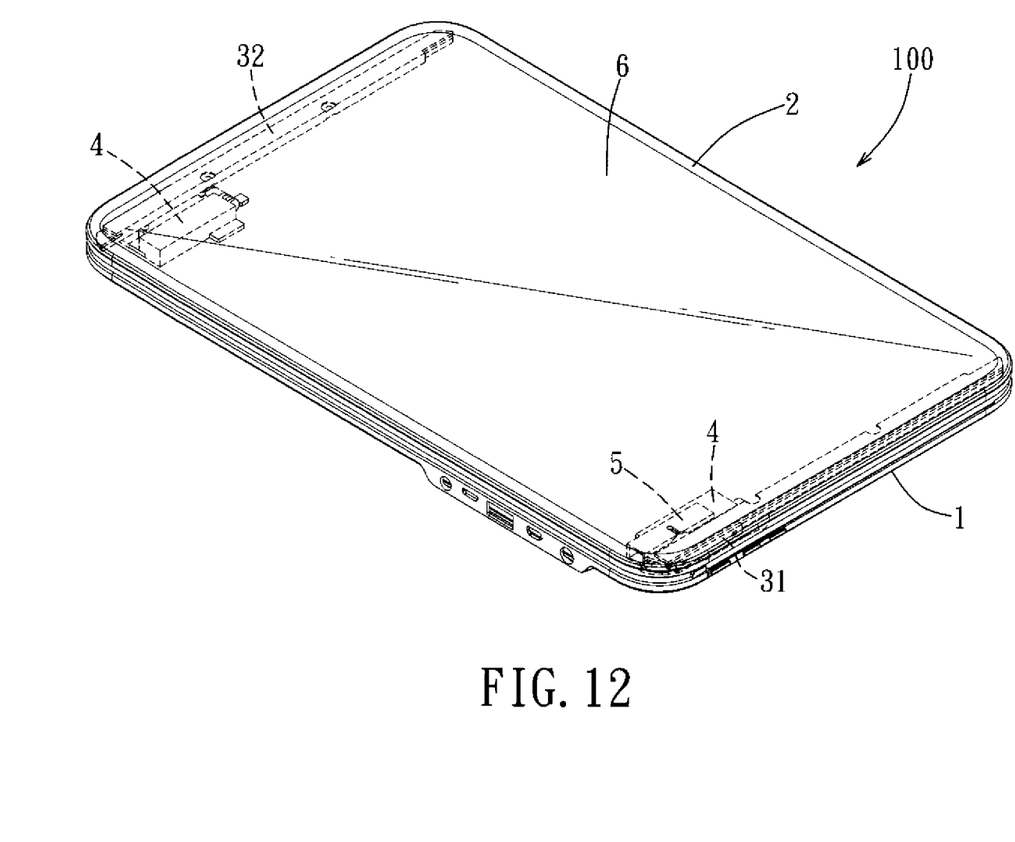
FIG. 12 is a view similar to FIG. 2, but taken from another angle.
Figure 13:
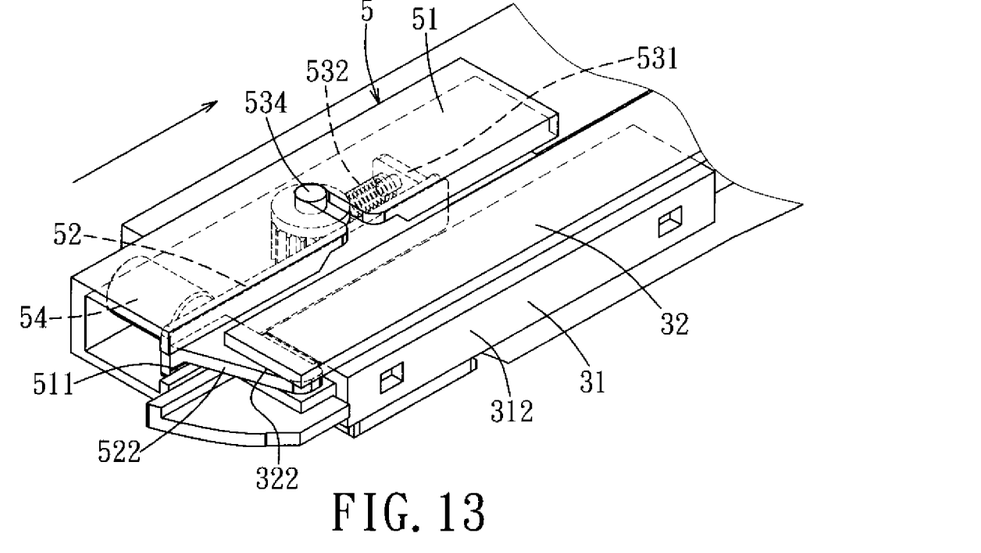
FIG. 13 is a fragmentary enlarged perspective view of FIG. 12, illustrating the spring member of the buffer mechanism in a compressed state when the sliding housing is moved to the closed position.
Figure 14:
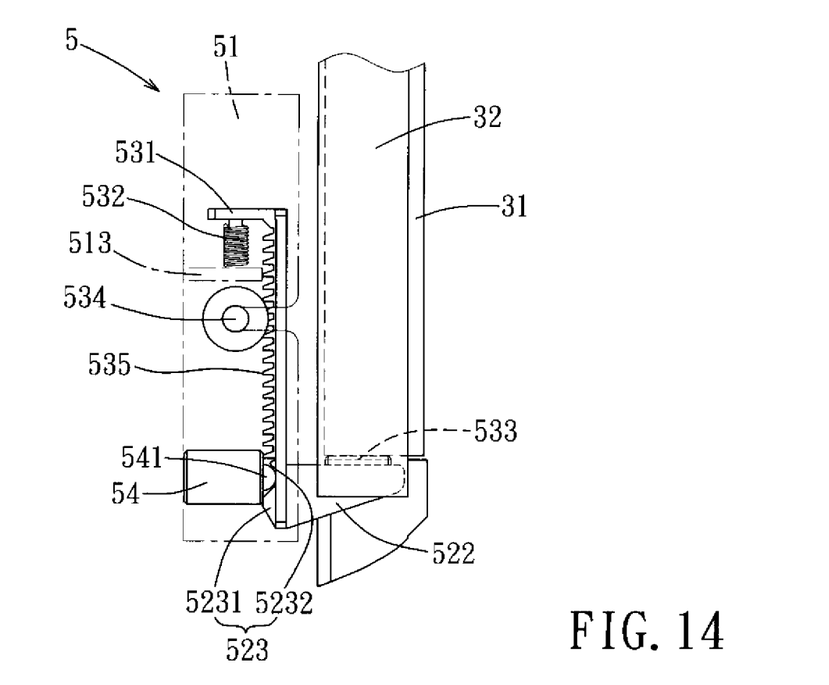
FIG. 14 is a schematic top view of FIG. 13.

With reference to FIGS. 3, 8 and 11, when the sliding housing 2 is in the open position, the spring member 532 is in a non-compressed state, and the limiting portion 523 is distal from the positioning element 54. Referring to FIGS. 12, 13 and 14, when the sliding housing 2 is moved from the open position toward the closed position, the stop portion 522 of the slide member 52 moves along with the sliding housing 2 toward the guide unit 31 until it is blocked by the guide rail 312 of the guide unit 31 in the slide rail 32. That is, as the sliding housing 2 moves continuously to the closed position, the stop portion 522 is blocked by the guide rail 312 and is retained thereat, while the mounting seat 51 moves continuously along with the sliding housing 2, so that there is relative movement between the mounting seat 51 and the slide member 52. At this state, the cushion pad 533 absorbs an impact between the stop portion 522 and the guide unit 31, and the positioning element 54 is proximate to the slide member 52. Further, as the positioning element 54 moves toward the slide member 52, the spring member 532 is compressed to store a restoring force, and, through the meshing resistance between the damping gear 534 and the rack gear 535, the speed of the mounting seat 51 relative to the slide member 52 is retarded.

Since the mounting seat 51 is fixed to the sliding housing 2, the sliding speed of the sliding housing 2 is also retarded when approaching the closed position. When the sliding housing 2 approaches the closed position, the plunger 541 of the positioning element 54 is pressed by the curved protrusion 5231 to retract into the cylinder body 542, and extends into the limiting groove 5232 so as to be retained thereat after the positioning element 54 passes over the curved protrusion 5231. At this time, the mounting seat 51 is limited from moving further, so that the mounting seat 51 is fixed relative to the slide member 52, and the sliding housing 2 is simultaneously positioned at the closed position.

Figure 15:
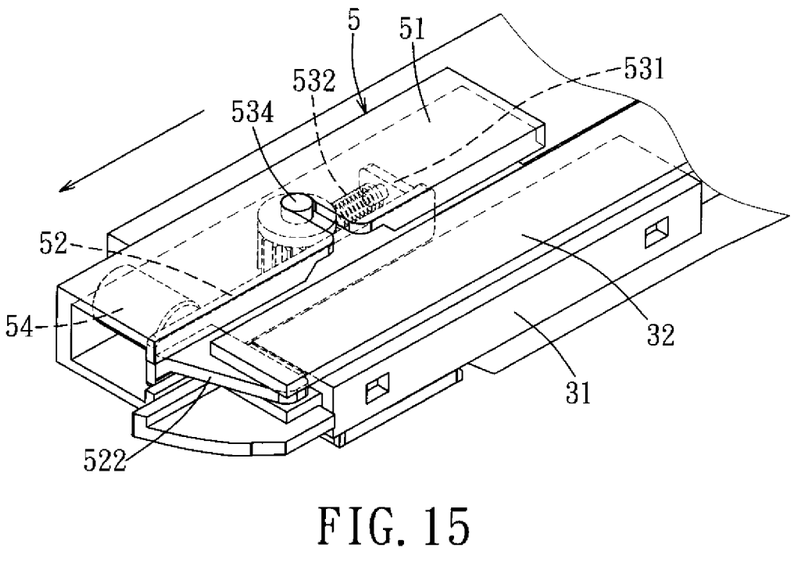
FIG. 15 is a view similar to FIG. 13, but illustrating how the mounting seat is biased by the spring member to move in a direction opposite to that shown in FIG. 13 when the sliding housing is moved to the open position.

Referring to FIGS. 12, 14 and 15, when it is desired to slide the sliding housing 2 from the closed position shown in FIG. 2 to the open position shown in FIG. 3, a force is applied to the sliding housing 2 so that the curved protrusion 5231 of the slide member 52 presses against the plunger 541 of the positioning element 54 to retract the plunger 541 into the cylinder body 542. After the positioning element 54 moves past the curved protrusion 5231 in a direction away from the limiting groove 5232, since the positioning element 54 is released from the limiting portion 523 of the slide member 52, the mounting seat 51 can slide relative to the slide member 52, and the restoring force of the spring member 532 is released to bias the mounting seat 51 together with the sliding housing 2 to move toward the open position. This facilitates the user to open the sliding housing 2 with a minimum effort.

Therefore, the buffer mechanism 5 can reduce the speed of the sliding housing 2 when approaching the closed position so that a large impact among the positioning components can be prevented, and can produce a resilient force the moment the sliding housing 2 is opened to assist in pushing the sliding housing 2 to slide toward the open position.

To sum up, in this embodiment, the correction mechanisms 4 are used to permit the sliding housing 2 to move smoothly between the open position and the closed position so as to facilitate one-hand operation of the user, and have buffering and shock-absorbing functions. Further, the buffer mechanism 5 is used to reduce the speed of the sliding housing 2 when the latter approaches the closed position so as to prevent a large impact among the positioning components. In addition, the buffer mechanism 5 can produce a resilient force the moment the sliding housing 2 is opened to assist in pushing the sliding housing 2 to slide toward the open position, thereby facilitating the user to open the sliding housing 2 with a minimum effort.

While the present invention has been described in connection with what is considered the most practical and embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A portable electronic device, comprising:
   a base housing;
   a sliding housing superposed on said base housing;
   a slide mechanism including a pair of guide units disposed on said base housing, and a pair of slide rails disposed on said sliding housing, said pair of said guide units and said pair of said slide rails cooperating with each other to permit sliding movement of said sliding housing relative to said base housing along a sliding direction between a closed position and an open position; and
   a pair of correction mechanisms disposed on said base housing and respectively adjacent to said slide rails, each of said correction mechanisms including at least two spaced-apart push-back members arranged along said sliding direction and adjacent to a respective said slide rail;

wherein when said slide rails deviate from said sliding direction and collide with said push-back members, said push-back members can push back said slide rails to a position parallel to said sliding direction so that said slide rails can slide smoothly relative to said guide units; and wherein each of said push-back members is resiliently displaceable in a direction perpendicular to said sliding direction when collided by said slide rails, and is biased to restore to its original position;

wherein each of said guide units includes a fixed portion fixed to said base housing, and a guide portion connected pivotally to said fixed portion and cooperating with a corresponding one of said slide rails.

2. The portable electronic device of claim 1, wherein each of said push-back members is configured as a roller.

3. The portable electronic device of claim 2, wherein each of said correction mechanisms further includes a fixed seat fixed to said base housing, a movable seat connected to said fixed seat and movable relative to the same in a direction perpendicular to said sliding direction, and a resilient unit disposed between said movable seat and said fixed seat to restore said movable seat to its original position, said push-back members being disposed on and movable along with said movable seat.

4. The portable electronic device of claim 1, further comprising a buffer mechanism disposed on said sliding housing, said buffer mechanism being adjacent to one of said slide rails and including a slide member.

5. The portable electronic device of claim 4, wherein said buffer mechanism further includes a buffer unit connected to said slide member, said slide member having a portion that is slidable in said one of said slide rails and that is opposite to said guide unit which cooperates with said one of said slide rails, wherein when said sliding housing is moved from said open position to said closed position, said portion of said slide member is blocked by said guide unit, and an impact between said portion of said slide member and said guide unit is buffered by said buffer unit.

6. The portable electronic device of claim 5, wherein said buffer unit includes a damping gear, and a rack gear formed integrally as one piece with said slide member and meshing with said damping gear.

7. The portable electronic device of claim 5, wherein said buffer mechanism further includes a mounting seat and a positioning element, said slide member, said buffer unit and said positioning element being disposed in said mounting seat, said mounting seat including a slide track to receive slidably said slide member, said positioning element limiting movement of said mounting seat when said sliding housing is at said closed position.

8. The portable electronic device of claim 7, wherein each of said slide rails of said slide mechanism has a slide groove.

9. The portable electronic device of claim 8, wherein each of said guide units has a guide portion extending into said slide groove, said slide member having a main body portion, a stop portion and a limiting portion.

10. The portable electronic device of claim 9, wherein said main body portion is elongated along said sliding direction and is located in said mounting seat.

11. The portable electronic device of claim 9, wherein said stop portion extends transversely from one end of said main body portion that is proximate to said positioning element and protrudes outwardly from said mounting seat into said slide groove in said slide rail that is adjacent to said buffer mechanism.

12. The portable electronic device of claim 9, wherein said limiting portion is formed on said main body portion opposite to said stop portion and cooperates with said positioning element to limit movement of said mounting seat relative to said slide member.

13. The portable electronic device of claim 9, wherein said buffer unit further includes a pressed portion and a spring member, said pressed portion being connected to said slide member and extending transversely from the other end of said main body portion that is opposite to said limiting portion into said mounting seat, said spring member being connected between said pressed portion and said mounting seat.

14. The portable electronic device of claim 13, wherein said buffer unit further includes a damping gear, and a rack gear formed integrally as one piece with said slide member and meshing with said damping gear, said damping gear being fixed to said mounting seat and being located between said spring member and said positioning element, said rack gear being formed on said main body portion and being located between said pressed portion and said limiting portion.

15. The portable electronic device of claim 14, wherein said positioning element is a cylinder, said limiting portion including a curved protrusion, and a limiting groove located between said curved protrusion and said rack gear.

16. The portable electronic device of claim 13, wherein said buffer unit further includes a cushion pad disposed on one side of said stop portion facing said guide unit that cooperates with said one of said slide rails.

* * * * *